(12) United States Patent
Schilling et al.

(10) Patent No.: US 6,760,134 B1
(45) Date of Patent: Jul. 6, 2004

(54) MULTICOLOR ELECTRONIC HOLOGRAPHY AND 3D IMAGE PROJECTION SYSTEM

(75) Inventors: Bradley W. Schilling, Fredericksburg, VA (US); Ting-Chung Poon, Blacksburg, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/392,182

(22) Filed: Mar. 20, 2003

(51) Int. Cl.[7] .................................................. G03H 1/10
(52) U.S. Cl. .............................. 359/10; 359/22; 359/9; 356/457
(58) Field of Search ................................ 359/9–11, 22, 359/30, 32; 356/457–458

(56) References Cited

U.S. PATENT DOCUMENTS 5,064,257 A * 11/1991 Shinoda et al. ............... 359/10
5,805,316 A *  9/1998 Shinoda et al. ............... 359/33

* cited by examiner

*Primary Examiner*—Drew A. Dunn
*Assistant Examiner*—Leo Boutsikaris
(74) *Attorney, Agent, or Firm*—William Anderson; Arthur Samora

(57) ABSTRACT

A three dimensional true color holographic imaging system using three primary color Fresnel-Zone-Pattern laser generators combined as a single beam that scans the target and the reflections of which are sensed simultaneously by a single electronic detector. The detector signals corresponding to each generator are then separated electronically and independently recorded.

7 Claims, 3 Drawing Sheets

MULTICOLOR ELECTRONIC HOLOGRAPHY AND 3D IMAGE PROJECTION SYSTEM

BACKGROUND OF THE INVENTION

1. Field of the Invention

Three-dimensional (3D) imaging, 3D-image projection, holography, color holography, electronic holography, digital holography, optical scanning holography, multicolor electronic holography, true-color 3D imaging and spatial light modulators.

2. Description of Prior Art

For many years holography has been investigated as a way to project three-dimensional (3D) information. Realistic 3D image projection has many applications both in the commercial and military sectors, such as entertainment, advertising, computer gaming for commercial markets, simulation, immersive training and 3D displays for military applications. For instance, army researcher have recently been investigating the use of photo-refractive crystals for holographic 3D displays. For example see "Three-dimensional image reconstruction using strontium-barium-niobate" by Brian P. Ketchel, Gary L. Wood, Richard J. Anderson and Gregory J. Salamo published in *Applied Physics Letters*, Vol. 71, p. 7–9, (1997) or "Three-dimensional holographic display using a photo-refractive crystal" by Christy A. Heid, Brian P. Ketchel, Gary L. Wood, Richard J. Anderson and Gregory J. Salamo, published in *SPIE* Vol. 3358, *Proceedings of the Sixth International Symposium on Display Holography*, p. 357–366, (1997). To date, there has been only limited success in applying holography techniques to the projection of realistic images, due largely to the single color nature of most hologram-reconstructed images. True-color holography (recording and reconstruction) has been investigated in detail and demonstrated using traditional photographic techniques, see for example, *Practical Holography* by Graham Saxby, published by Prentice Hall, New York, (1994) or "Color-reflection holography: theory and experiment," by Paul M. Hubel and Laszlo Solymar published in *Applied Optics*, Vol. 30, No. 29, p. 4190–4203. (1991). In recent years, researchers have proposed electronic (or digital) holography techniques, by which the time consuming chemical processing involved in traditional holography is eliminated, see for example "Optical Scanning Holography," by T. C. Poon, M. Wu, K. Shinoda, and Y. Suzuki, published in *Proceedings of the IEEE*, Vol. 84, p. 753–764 (1996). In electronic holography, holograms are recorded directly by photosensitive devices such as photodiodes or a CCD camera and usually stored as digital images, for example see "Digital Recording and numerical reconstruction of holograms: reduction of the spatial frequency spectrum," by Ulf Schnars, Thomas M. Kreis, and Werner P. O. Juptner published in *Optical Engineering*, Vol. 35 No.4, p. 977–982, (1996) or "Three-dimensional microscopy with phase-shifting digital holography," by Tong Zhang and Ichirou Yamaguchi published in *Optics Letters*, Vol. 23, p. 1221–1223, (1998). These techniques have opened the way for such things as 3D holographic imaging in real-time, as indicated in "Real-time Optical Holography Using a Spatial Light Modulator" by T. C. Poon, B. D. Duncan, M. H. Wu, K. Shinoda and Y. Suzuki published in the *Japanese Journal of Applied Physics*, Vol. 29, pp. L1840–L1842, (1990) and also in "Real-Time Two-Dimensional Holographic Imaging Using an Electron-Beam-Addressed Spatial Light Modulator," by T. C. Poon, B. W. Schilling, M. H. Wu, K. Shinoda and Y. Suzuki published in *Optics Letters*, Vol. 18, pp. 63–65, (1993).

They have also opened the way to numerical image reconstruction as discussed in "Real-time preprocessing of holographic information," by B. W. Schilling and T. C. Poon published in *Optical Engineering*, Vol. 34, No. 11, pp. 3174–3180. Nov. (1995). Just as digital cameras will supplant photographic cameras in many situations. Advances in electro-optic devices such as CCD cameras and spatial light modulators (SLMs) are making electronic holography not only a reality, but also the preferred method for 3D holographic imaging for many applications. It is notable that electronic 3D color display of computer generated holograms (CGH) has also been investigated and demonstrated as indicated in "Color Images with the MIT Holographic Video Display," by Pierre St-Hilaire, Stephen A. Benton, Mark Lucente, and Paul M. Hubel published in *SPIE Proc*, Vol. 1667 *Practical Holography* VI, p. 73–84, (1992) as well as in "Approach to the Multicolor Imaging From Computer Generated Hologram," by Tadashi Nakamura, Hideya Takahashi, and Eiji Shimizu published in *SPIE Proc*, Vol. 2176 *Practical Holography* VIII, p. 102–107, (1994). However, these techniques offer no means to record a hologram of a real object, as holograms are generated via computer.

It is easy to see the many advantages digital holography has over traditional, photographic holography, and there are even more such advantages when applied to the true-color holography problem. In the past, true color holography has meant the recording of three separate monochromatic holograms, each at a different laser wavelength, superimposed on the same photographic plate as can be seen in the article "Color-reflection holography: theory and experiment, mentioned above. Although the three separate holograms can be recorded simultaneously, often they are recorded in succession, sometimes using different emulsions and different exposure times. Saxby, above, cites a number of problematic practical considerations faced by true-color holographers, for instance the availability of truly panchromatic holographic emulsions, loss of fringe contrast, and cross talk. The lack of appropriate holographic emulsions forces the use of separate emulsions and therefore successive hologram recording for each color. For single emulsion holograms, fringe contrast can suffer due to very similar fringe patterns (from each color) occupying the same space in the photographic emulsion. Also, cross talk is a factor upon image reconstruction since the red laser will not only reconstruct the geometrically correct image from the "red" fringes, but also two smaller, displaced images from the fringes created by the green and blue lasers.

FIG. 1 shows a system used for Optical Scanning Holography (OSH). Holographic recording by OSH is a technique, described in U.S. Pat. No. 5,064,257 for an "Optical Heterodyne Scanning Type Holographic Device" which is based on scanning the object with a Fresnel Zone Pattern (FZP). The standard setup for mono-color holographic recording by OSH requires a two-beam laser light generator, which is a part of the system shown in FIG. 1. The two beams originate from the same laser 1 operating at frequency $\omega_1$. The original laser beam is separated into first and second beams using a beam-splitter (BSI) 2, that reflects nominally 50% of the original beam along an axis normal to the axis of the original laser beam. The first beam is passed through an Acousto-Optical Modulator 3 (AOM1) operating in the Bragg regime. Like other modulators this one produces sidebands of different orders of frequency, however, they are emitted at different angles. Here it is modulated with an electrically induced acoustic signal from an electrical signal generator 4 operating at cos ($\Omega_1 t$), e.g. $\Omega_1$=40 MHz and the output angle is chosen to emit only the first order frequency ($\omega+\Omega_1$)t. The second beam is further redirected by a mirror 7 as a third beam parallel to the first direct beam. This third beam passes through a beam expander 8 (BE2) to collimate the beam and increase its diameter to a predetermined size. The third beam also passes through a correction lens 9 to form a spherical wave. The modulated first beam ($\omega_1+\Omega_1$)t is also passed through a beam expander 5 (BE1), similar to BE2 that collimates this first beam to have a plane wavefront and increases its diameter to match that of the third beam. The third and first beams define a co-dependent pair of output beams for one mono-color two-beam laser generator.

To create an FZP beam, the output beams of a co-dependent pair are redirected into a fourth or FZP beam, e.g. having an axis normally intersecting the axes of the pair, by reflectors 6 and 10, respectively. Reflector 6 may be a simple flat folding mirror that redirects the first beam so that its axis normally intersects the axis of the third beam. Reflector 10, however, must be a combining reflector, such as a second beam splitter or a narrow band filter mirror tuned to the frequency of the third beam. The latter passes at least about half of the redirected first beam and normally redirects an equal portion of the third beam onto the axis of the fourth beam. This combining reflector is centered on the axial intersection of the first and third generator beams. When the combining reflector is a beam-splitter each of the first and third beams emerge as first and second combined output beams, on the extended axes of the first and third beams, respectively. The splitter is designed to emit only the first combined beam. The axis of this beam thus becomes a shared main axis The unwanted second combined beam can be suppressed by placing a light absorbing layer 10a on the extended axis of the third beam to dissipate the unwanted second combined beam. The first combined output beam is next directed through a third beam-splitter 11 (BS3), to be described later, suppressing any reflected portion of this beam. The unreflected portion of this beam is next further redirected by an electric x-y scanning mirror 12 operating at standard horizontal and vertical frequencies; and finally arrives at a target 13. The target is thus immersed in a Fresnel Zone Pattern (FZP), which it reflects back to the scanning mirror producing a detection beam directed along the main shared axis and into the third beam-splitter, The normally reflected portion of the detection beam passes through lens 14 to be focused onto a detector axis. The unreflected portion of the return or detection beam is too weak and scattered to interact with the oppositely directed beams from the two-beam generator. The 3D location of each target scatterer is encoded in the position and size of the FZP, see for example "Fresnel Transformations of Images," by L. Mertz and N. O. Young published in the *Proceedings of the conference on Optical Instruments and Techniques*, K. J. Habell, ed. Chapman and Hall, London, pp. 305–312, (1962).

The intensity of the Fresnel Zone Pattern I (x, y, z, t), used for heterodyne detection, is mathematically represented by the following equation:

$$I(x, y, z; t) = A^2 + B^2 + 2AB\sin\left(\frac{k_1}{2z}[x^2 + y^2] + \Omega_1 t\right). \tag{1}$$

See, "Three-dimensional microscopy by optical scanning holography," by T. C. Poon, K. B. Doh, B. W. Schilling, M. H. Wu, K. Shinoda, and Y. Suzuki published in *Optical Engineering*, Vol.34, No.5, pp. 1338–1344, (1995). In equation (1), A and B are the initial intensities of the light beams, $k_1=\omega_1/c$ is the wave-number of the laser light, c is the speed of light, and z is the axial distance measured from the focus of the spherical wave to the target. This interference pattern is raster-scanned over the object, which has an intensity reflectance given by $|\Gamma(x,y,z)|^2$. The target reflects the scanning light, which is collected by lens 14 (L4) and focused onto a photo detector 15, or for increased sensitivity, a photo-multiplier tube (PMT). The scanning action results in the spatial convolution of the scanning field intensity and the object, thus encoding each object scatterer by an FZP. Some insight into the OSH process may be gained by taking a simple example. Let the object transmittance be a single scatterer, $|\Gamma(x, y, z)|^2=\delta(x-x_0, y-y_0; z-z_0)$. The resulting heterodyned output current from a band-pass filter 16. tuned to $\Omega_1$, (BPF1) is proportional to $$i_\Omega(x, y; z, t) \propto \cos\left(\frac{k_1}{2z_0}[(x-x_0)^2 + (y-y_0)^2] + \Omega_1 t\right). \tag{2}$$

This current contains the holographic information pertaining to the off-axis point object. In order to extract this information, the signal is electronically multiplied by cos ($\Omega_1 t$), produced by generator 18, in a conventional mixing circuit 17 commonly found in most audio and video receivers. This is fed to a low-pass filter 19. The resulting demodulated signal current $i_d$, which is represented by the following formula;

$$i_d(x, y; z) \propto \cos\left(\frac{k_1}{2z_0}[(x-x_0)^2 + (y-y_0)^2]\right). \tag{3}$$

contains the location ($x_0$, $y_0$) as well as the depth ($z_0$) information of the point object. In other words, the current $i_d$ contains all the holographic information of the off-axis point source object. The intensity information obtained by demodulating current $i_d$ may then be used to create a true hologram by synchronizing it with the x-y scanning signals and displaying the 2D image on a television type monitor, not shown. This electronic hologram can conveniently be sent to a video digitizer and converted to a digital image for storage and/or processing. The 3D object can then be reconstructed from the hologram either optically or digitally, as will be shown.

FIG. 2 shows the prior art method to achieve real image projection using either a photographic emulsion or other type of spatial light modulator (SLM). The three-dimensional image is reconstructed by illuminating the emulsion or SLM, containing the stored hologram, with the original reference beam used for recording. For photographic holography, this typically involves passing collimated laser light through the hologram. The collimated light is modulated by the interference pattern recorded in the hologram, and the real image is reconstructed. For digital or electronic holography, image reconstruction is often achieved numerically. However, for applications in which it is desired to project a real time image using a digital hologram, a high-resolution SLM can be used in a similar manner. Electronic SLMs have been investigated extensively for the purposes of hologram reconstruction, usually in conjunction with computer-generated holograms. Such reconstruction is shown in "Real-time computer-generated hologram by means of liquid-crystal television spatial light modulator" by Fai Mok, Joseph Diep, Hua-Kuang Liu and Demetri Psaltis published in *Optics Letters*, Vol. 11, No. 11, p. 748–750 (1986) or "Computer-generated holograms by means of a magneto optic spatial light modulator" by Joseph N. Mait and Glenn S. Himes published in *Applied Optics*, Vol. 28, No. 22, p. 4879–4887 (1989). Real-time hologram construction and reconstruction has been reported, however, using a high-resolution liquid-crystal SLM. For example an SLM with up to 175 line pairs/mm appears in "Real-time Optical Holography Using a Spatial Light Modulator" cited above. Also as reported in the same article, applicants have experimented with an electron-beam-addressed spatial light modulator (EBSLM) and reconstructed real images recorded by the OSH technique in real-time. Suffice it to say that there are several types of commercially available SLMs, which may be used for coherent image reconstruction of this type. The details of real-image reconstruction using SLMs are case dependant and need not be addressed here. The situations are fundamentally the same, and the basic architecture is that shown in FIG. 2. The hologram is written to the SLM electronically, which in turn acts identically in the same way as the photographic hologram. The SLM (and hologram) is illuminated with the coherent light beam. The SLM then modulates the coherent light in accordance with the hologram pattern. The modulated light diffracts and, at some distance from the SLM, forms the real image stored in the hologram. It is fair to say that the use of an SLM to form a real-image reconstruction is well understood. Although not revolutionary, this technique of real-image projection is an integral part of the proposed true-color electronic holographic recording and 3D image projection system, according to the present invention.

SUMMARY OF THE INVENTION

A true-color three dimensional laser real-time image recording and projection system using active recording components such as, electronic heterodyne mixers, coherent primary color lasers, electro-optical detectors, electro-acousto-optic modulators; electro-optical spatial light modulators, combined with passive components including electronic band-pass filters; optical beam splitters, optical beam expanders, lenses and mirrors. Image projection preferably uses lasers, beam combiners and SLM's.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
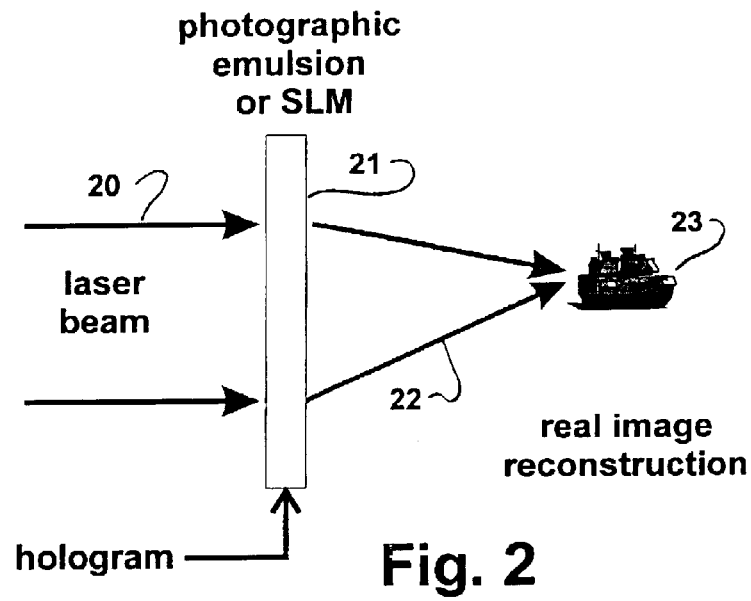
Figure 3:
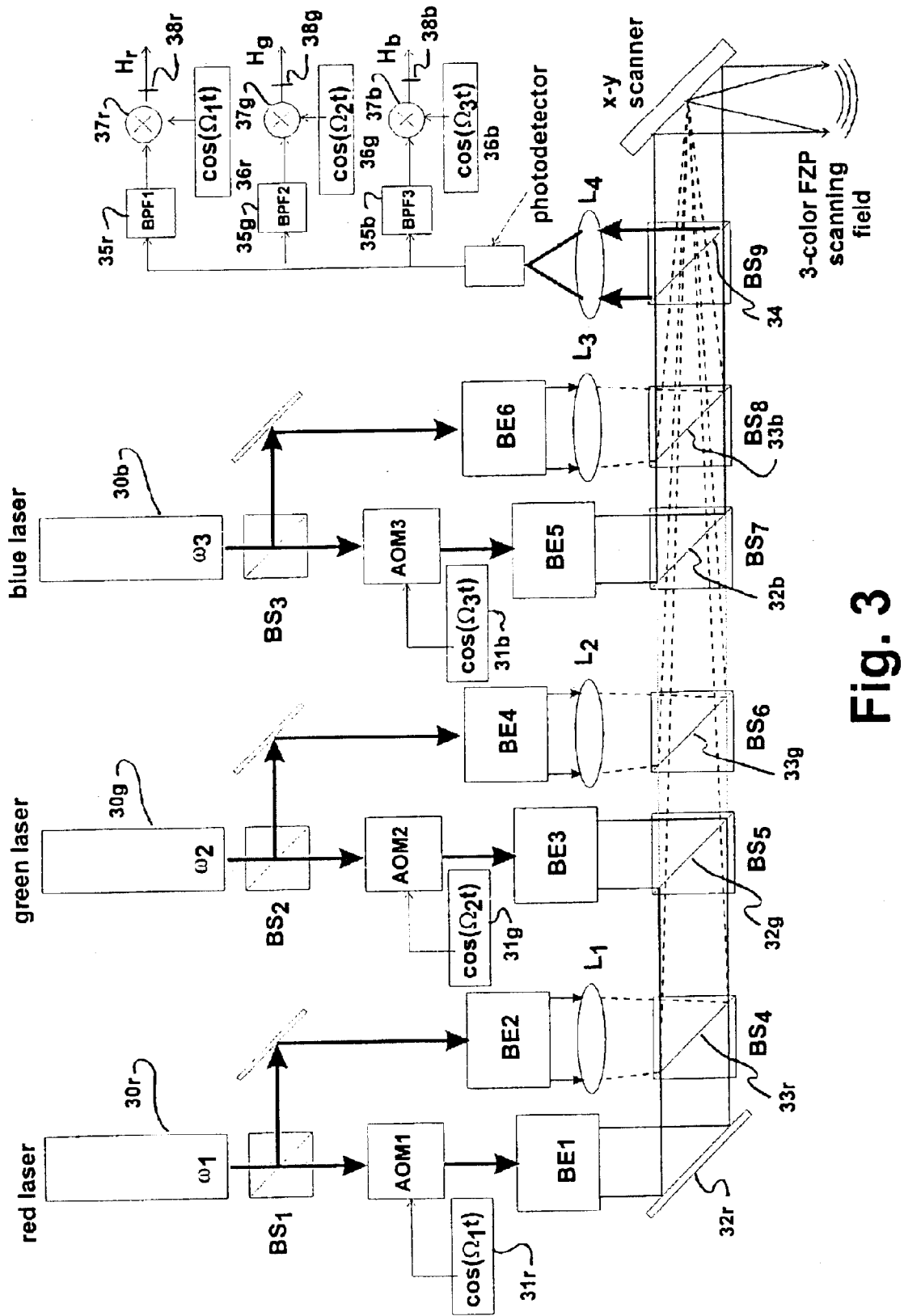
FIG. 3 shows a system, according to the present invention, for recording a realistic three dimensional image of an object or scene using Multicolor Holographic Recording (MHR)

Referring now to the drawings, and more particularly to FIG. 3, there is shown an imaging system that employs a complete multicolor holography technique based only on an electronic holography approach, for the first time. The technique is based on the proven, and patented, holographic recording technique known as optical scanning holography (OSH), discussed above at FIG. 2. Three of the structures from FIG. 2 are combined, by aligning their main shared axes. Specifically, the creation of multicolor 3D image projections is feasible based on simultaneously recording three separate (digital) holograms created with red, green, and blue recording lasers. Later multicolor 3D image reconstruction will be based on incoherently superimposing three separate real-image projections, preferably by illuminating three SLMs with red, green, and blue lasers equivalent to the recording lasers. Employing electronic, rather than photographic, holography techniques, can alleviate many of the problems of multicolor holography, cited above. The beauty of the proposed system is that the holographic information manifests itself as a current, generated by the photodiode or photo-multiplier tube (PMT), which is an advantage in numerous ways. By recording separate color information at slightly different heterodyne frequencies, the colors can be separated by electronic filtering. Therefore, the red, green, and blue holograms are recorded simultaneously, but are completely separable (at least to the limits of communications theory.) Since the holograms can be separated, fringe contrast and cross-talk are not issues. In addition, differences in "exposure" times can also be adjusted electronically through amplification, or even digitally. These ideas will become clearer as we discuss the details of applicants' multicolor, electronic holography.

Figure 1:
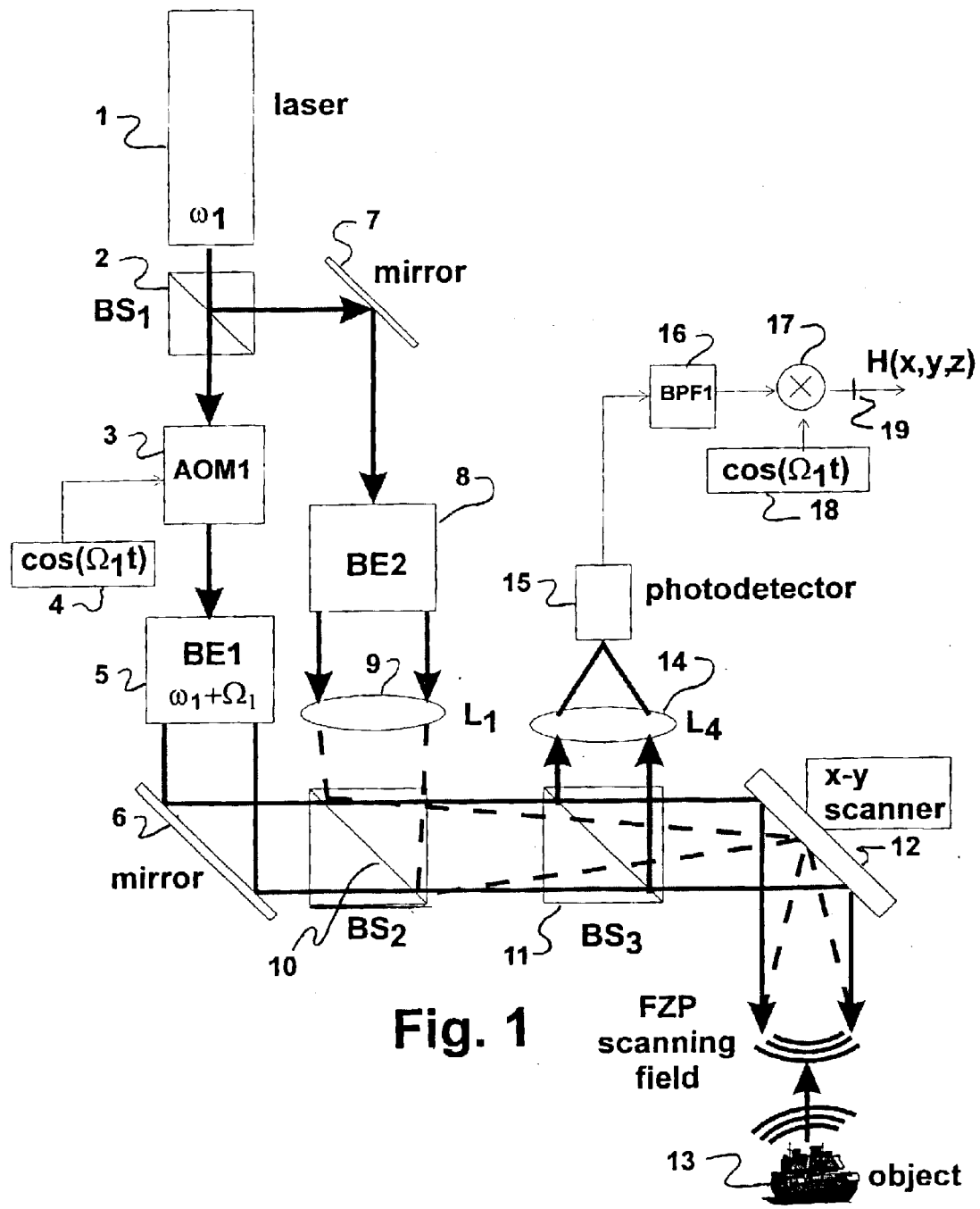
FIG. 1 shows the prior art system, discussed above, for creating a realistic three-dimensional image of an object or scene using Optical Scanning Holography (OSH FIG. 2 shows the prior art system, discussed above, for creating a realistic three-dimensional image of an object or scene using a photographic emulsion or a Spatial Light Modulator (SLM)

FIG. 3 shows how the OSH technique, described in FIG. 1. can be extended to a multiple-color holography system for multicolor holography. Though theoretically straightforward, this extension is experimentally challenging, as illustrated in this Figure. For three-color holography, the OSH system is simply recreated twice more, at two other wavelengths. The result is three substantially identical scanning holography setups, each at a different optical wavelength, operating in tandem. Red, green and blue lasers $30r$, $30g$ and $30b$ can be used as the three "color channels," forming a set of primary colors. The operating frequencies of the red, green, and blue lasers are indicated as $\omega_1$, $\omega_2$ and $\omega_3$, respectively. For each of the color channels, a plane wave and a spherical wave of different temporal frequency must be superimposed to form an FZP for that color. Therefore, six separate optical fields must be combined along the same optical axis to form a three-color FZP, which allows scanning using a single x-y scanner. Reflectors chosen from mirrors, filter mirrors or beam-splitters $32r$, $33r$, $32g$, $33g$ $32b$ and $33b$ (BS4 through BS8) combine the six fields. In the series arrangement shown, reflector $32r$ or whichever reflector is first is a simple flat mirror. The rest must be splitters, filter mirrors, prisms or similar optical combining devices. An all reflector system tends to be lighter and avoids chromatic aberration problems. It is desirable to combine the fields prior to scanning for a number of reasons. First, it simplifies the system by minimizing the required number of x-y scanners. A single scanner is cost effective and eliminates the need to synchronize multiple scans. In addition, possible distortion introduced by a difference in scanning angle for the various colors is eliminated. This simplified experimental layout is diagramed for maximum clarity, but other configurations are possible and in fact, may be preferable. For instance, it has been shown that the following quantities are all related: sampling rate, resolution, the number of Fresnel zones present in the scanning field, the maximum scanning distance, and overall image quality. For example, using the exact configuration pictured in this Figure, each color channel will have a slightly different sized scanning pattern, and thus contain a different number of Fresnel zones. Fewer zones in the scanning field will result in lower resolution and reduced overall image quality. As shown, the lenses (L1, L2, and L3), will each have different focal lengths such that the spherical wave for each color comes to a focus at the surface of the scanning mirror. It is possible and preferable, however, for the lenses to have equal focal lengths and be re positioned such that they are equidistant from the scanning mirror. In this optimum configuration, the FZP color channels will then be identical in shape at the object, minimizing color distortion. The beam expanders, BE1 through BE6 also should be identical to each other and to elements 5 or 8 in FIG. 1. The six fields are directed to a scanning mirror identical to element 12 in FIG. 1 and reflected toward the object as a three-color FZP. The scanning mirror scans the laser pattern over the object in a raster fashion. This same mirror simultaneously collects the light reflected by the target, which is redirected to the shared main axis and further redirected to the detector axis by beam-splitter 34 (BS9). There the light passes through collection lens 14 (L4) and is focused on the photo-detector 15. The detected signal is filtered through three wide band-pass filters 35$r$, 35$g$, and 35$b$ to separate the modulated red, green and blue video signals, respectively. The same signals that went into the AOMs are then combined with these modulated red, green and blue signals in mixers 37$r$, 37$g$ and 37$b$, respectively, to demodulate them. The demodulated signals are again filtered through narrow band-pass filters 38$r$, 38$g$ and 38$b$, respectively, to obtain the lower sideband signals $H_r$, $H_g$ and $H_b$ as the final video hologram signals.

It is the optically heterodyned nature of this technique that makes it uniquely suited for color holography, and gives the electronic holography method advantages overt traditional techniques for true-color holography. As previously mentioned combining a plane wave and a spherical of different temporal frequency creates the FZP scanning field for each color channel. The frequency shift is created by passing one leg of each interferometer through an acousto-optic modulator operating as a Bragg cell. To allow for complete separation of each color channel, each AOM in FIG. 3 is simply operated at a different heterodyned frequency, i.e. cos ($\Omega_1 t$), cos ($\Omega_2 t$) and cos ($\Omega_3 t$); e.g. $\Omega_1$=35 MHz, $\Omega_2$=40 MHz and $\Omega_3$=45 MHz. These frequencies can be provided by mixing a 40 mHz signal with a 5 mHz signal and using appropriate filtering. This heterodyning is electronically detected, filtered, and demodulated in the receive process, generating three separate holograms $H_r$, $H_g$, and $H_b$. The necessary difference in heterodyne frequencies is dependent on the ability of the electronic filters used to separate the signals. The bandwidth of each color signal is dominated by the scan rate of the system That is, the bandwidth for each color, $B_n=1/t_{pix}$, where $t_{pix}$ is the single pixel dwell time. Currently the scan rates are not very demanding. Assuming a 256×256 image is recorded in 10 seconds, the bandwidth required for each color is less than 10 KHz. Insight into the signals which make up the three-color holograms is gained by considering, again, the mathematical development of the FZP laser field above.

Extending the mathematical development given for FIG. 2 to the three-color case, we see that the three-color scanning field can be given mathematically by $$I_c(x,y,z;t) = C + \sum_{n=1}^{3} D_n \sin\left(\frac{k_n}{2z}[x^2+y^2] + \Omega_n t\right) \quad [4]$$

In equation (4), C and $D_n$ represent constant intensities resulting from the superposition of all three lasers, and n=1, 2, or 3, respectively, for the red, green and blue fields. Similarly, equation (2) can be extrapolated to the three-color case, resulting in the following expression, which is proportional to the heterodyned output current:

$$i_{\Omega_n}(x,y;z,t) \propto \sum_{n=1}^{3} a_n \sin\left(\frac{k_n}{2z_0}[(x-x_0)^2 + (y-y_0)^2] + \Omega_n t\right). \quad (4)$$

In equation (4), C and $D_n$ represent constant intensities resulting from the superposition of all three lasers, and n=1, 2 or 3 depending of the which of the three colors, red, green or blue is being represented. Similarly, equation (2) can be extrapolated to the three-color case, resulting in the following expression, which is proportional to the heterodyned output current:

$$i_{\Omega_n}(x,y;z,t) \propto \sum_{n=1}^{3} a_n \sin\left(\frac{k_n}{2z_0}[(x-x_0)^2 + (y-y_0)^2] + \Omega_n t\right). \quad (5)$$

In equation (5), $a_n$ represents the point object's reflectance coefficient for each of the primary colors. As equation (5) shows, the current resulting from scanning of the point object by the three-color FZP is, temporally, a signal consisting of three separate sinusoids. Each sinusoid can be isolated electronically according to the discussion above. After demodulation, each separate frequency contains the location and depth information of the object in question. In other words, the photo-detector current contains three separate (and easily separable) single-color holograms, in accordance with the current given in equation (5). It is also important to note that all of the three-color holograms are recorded simultaneously. The individual currents are synchronized with the scanning signal currents and each is easily digitized, and separately stored simultaneously. Each digitized color current taken with the digitized scanning signal currents provides a complete mono-color hologram; e.g. $H_r$, $H_g$, or $H_b$. Each color signal can be enhanced using either analog or digital filters and similar programming techniques. Projection using SLMs is an effective way to create a true color image reconstruction of the hologram. As with the photographic case, true-color image reconstruction for applicant's electronic holography system is based on the incoherent spatial superposition of three separate hologram reconstructions. The technique is a simple extension of mono-color reconstruction using a single SLM, as was discussed at FIG. 2.

Figure 4:
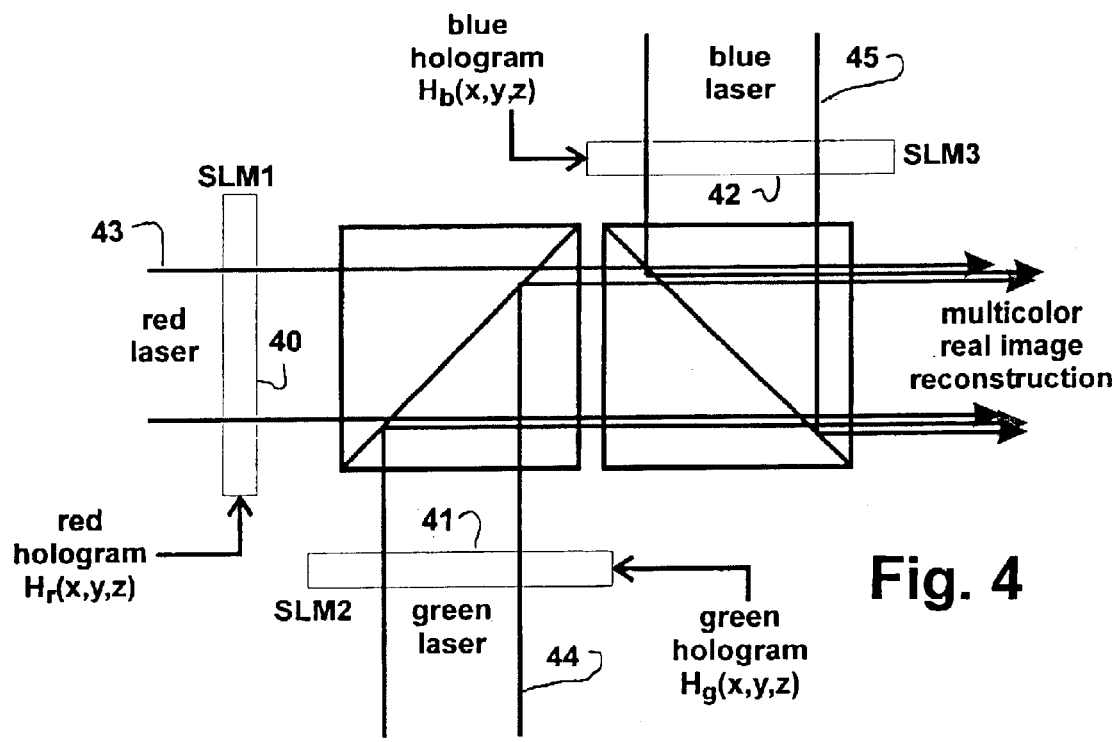
FIG. 4 shows a system, according to the present invention, for projecting a realistic three dimensional image of an object or scene using the system of FIG. 3, three Spatial Light Modulators and a pair of tuned reflectors or beam splitters used as beam combiners.

A diagram of the applicant's setup is shown in FIG. 4. Three SLMs 40, 41 and 42 are used, a separate SLM for each color. The holograms, $H_r$, $H_g$, and $H_b$ are written, each to a different SLM. Similar setups have been proposed for multicolor imaging using SLMs, but only for computer generated holograms (CGH's). To avoid the expense and complexity of utilizing three SLMs, Collier and Nakamura et al, see above, have proposed multicolor reconstruction using a single SLM and "non-overlapping spatial multiplexing. Non-overlapping spatial multiplexing is a technique directly extrapolated from photographic holography, in which different color information is interlaced on a single hologram using strip-like masks and filters. For a CGH, the separate color strips are simply generated computationally and written to the SLM. accordingly. Color filtering is necessary to minimize color cross talk by only allowing the strips of a certain color to be illuminated by the appropriate reference beam.

The image reconstruction for applicant's three-SLM system requires that the separate color images, illuminated by red, green and blue lasers 43, 44 and 45, respectively, be combined via a pair of beam splitters 46 and 47, positioned to the SLM's so that the images precisely overlap in space. Each color image reconstruction will exist at a distance, z, from the SLM in accordance with the recording. For OSH, the distance, z, is equal to the distance between the object and the focus of the spherical wave of the FZP. For this reason, for the recording scheme shown in FIG. 3, each SLM must be equidistant from the plane of real image reconstruction, since the spherical waves for each color of the FZP come into focus at the same point.

While this invention has been described in terms of preferred embodiment consisting of a series of FZP generators, those skilled in the art will recognize that the invention can be practiced with modification within the spirit and scope of the appended claims.

Having thus described my invention, what We claim as new and desire to secure by Letters Patent is as follows:

1. A real-time true-color holographic imaging system for a selected target, wherein said system includes:
   a first optical platform;
   red, green and blue laser light generators mounted on said platform, each generator including,
      a colored laser producing a main straight and narrow input beam centered on a main optical axis;
      a main beam splitting means centered at the end of said main axis to form substantially equal first and second co-dependent beams from said main beam, defining coextensive and normally extensive axes therewith, respectively, from said end;
      a beam folding reflector means centered at the end of said second axis to form a third beam, said third beam defining an axis parallel to said coextensive axis;
      an acousto-optical modulator (AOM) means centered on said coextensive axis to change the optical frequency of first beam by n megahertz in response to an n megahertz carrier signal, where n is different for each of said generators;
      first and second passive optical beam expander lens means centered on said coextensive and parallel axes, respectively to increase and equalize the diameter of said first and third beams, thereby establishing a predefined system, aperture; and
      at least one convex passive optical lens means centered on one of said coextensive and parallel axes to refocus the wave-front of one of said first and third beams from flat to spherical;
   and wherein said system further includes:
      a radio frequency oscillator means coupled between said AOM means for generating three different carrier signals at frequencies of n=r, n=g and n=b mHz;
      a beam combining means to redirect said first and third beams of all of said laser light generators into a single tri-color FZP (Fresnel Zone Pattern) beam centered on a shared optical axis with an output end from which said FZP beam emerges;
      an electronic scan signal generating means to create two periodic, orthogonally and harmonically related, sawtooth electronic scan signals, the longest period of which defines a complete scan cycle;
      a motorized scan reflector means centered at said output end and electronically coupled to said scan signal generating means to redirect said input FZP beam into a raster pattern that covers the entire exposed surface of said target during each complete scan cycle and to redirect a tricolor FZP return beam; reflected back from said target to said scan reflector and onto said shared axis;
      a secondary beam-splitting reflector means centered on said shared axis adjacent said scan reflector means to further redirect said return beam to a detection axis intersecting said shared axis, while passing at least a portion of said input FZP beam unreflecteded;
      an opto-electronic detector means centered on the end of said detection axis to generate a wide frequency band output current proportional to the optical amplitude variations of said return beam;
      three electronic primary band-pass filters coupled in parallel to the output of said detector to separate said complex current into three narrow frequency band color currents each centered on a different carrier frequency of n;
      a demodulating circuit means coupled to the output of each of said filters and a corresponding output of said radio frequency oscillator means to multiply the signals from said outputs together and
      three electronic secondary band-pass filters each coupled to the output of a different demodulating circuit means and designed to pass only the lower sideband signals from that output as a primary color video signal;
      a signal processor means coupled to the outputs of said secondary filters and said scan signal generator means to synchronize, integrate and store said scan signals with said video signals in a TV type storage medium.

2. An imaging system according to claim 1, wherein;
   said beam combining means comprises an array of reflectors;
   all of said beam axes lie in a common plane fixed with respect to said first optical platform, said axes having an inter-relationship chosen from a group comprising coextensive, parallel and normal; and
   said beam splitting means as well as said reflectors all being plane reflectors normal to said common plane each reflector being centered in beam path at an angle of 45 degrees to said axes.

3. An imaging system according to claim 1, wherein said storage medium includes;
   the phosphor screen of a standard television receiver with red, green, and blue video, as well as x and y scan, inputs.

4. An imaging system according to claim 1, wherein said storage medium includes;
   a color TV type tape recorder.

5. An imaging system according to claim 1, wherein said storage medium includes;
   a color TV type digital video disk recorder with means to convert analog video signals to digital video signals.

6. An imaging system according to claim 1, wherein said storage medium includes;
   a second optical platform;
   three Spatial Light Modulators fixed with respect to said second optical platform, each coupled to only a different one of said red, green and blue detectors;
   red, green and blue lasers mounted on said second platform illuminating said SLMs, respectively, and
   passive optical reflectors mounted on said second platform arranged to register the light images emitted from said SLMs as one tri-color image.

7. An imaging system according to claim 6, wherein said passive optical reflectors include:
   first and second juxtaposed cube-shaped beam combiners with an x axis through both cubes and mutually perpendicular y and z axes, said y axis intersecting said x axis at the center of said first cube and said z axis intersecting said x axis at the center of said second cube, each of said lasers having an axis aligned with one of said x, y and z axes.

\* \* \* \* \*